US009131095B2

(12) United States Patent
Kwak et al.

(10) Patent No.: US 9,131,095 B2
(45) Date of Patent: Sep. 8, 2015

(54) IMAGE FORMING APPARATUS AND METHOD OF CONTROLLING THE SAME

(71) Applicant: SAMSUNG ELECTRONICS CO., LTD., Suwon-si, Gyeonggi-do (KR)

(72) Inventors: Eun Bit Kwak, Seoul (KR); Han Sung Kim, Seoul (KR); Chun Sub Ryu, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/337,816

(22) Filed: Jul. 22, 2014

(65) Prior Publication Data

US 2015/0092252 A1    Apr. 2, 2015

(30) Foreign Application Priority Data

Sep. 30, 2013   (KR) .................. 10-2013-0116078

(51) Int. Cl.
*H04N 1/04*   (2006.01)
*H04N 1/00*   (2006.01)

(52) U.S. Cl.
CPC ....... *H04N 1/00925* (2013.01); *H04N 1/00278* (2013.01)

(58) Field of Classification Search
CPC .......... H04N 1/32101; H04N 21/4263; H04N 21/4383; H04N 21/44016; H04N 21/44209; H04N 21/4524; H04N 2201/0041; H04N 2201/0055; H04N 2201/0058; H04N 2201/0081; H04N 2201/0084
USPC .................. 358/474, 497, 496, 488, 448, 449
See application file for complete search history.

(56) References Cited

U.S. PATENT DOCUMENTS

| 5,117,260 | A | * | 5/1992 | Ariga et al. ...................... 399/75 |
| 5,535,040 | A | * | 7/1996 | Ohtsuka et al. ............. 359/210.1 |
| 5,581,613 | A | * | 12/1996 | Nagashima et al. .......... 380/201 |
| 6,084,692 | A | * | 7/2000 | Ohtani et al. ................. 358/509 |
| 6,089,772 | A | * | 7/2000 | Takemura et al. ............. 400/625 |
| 6,275,234 | B1 | * | 8/2001 | Iwaki ............................. 345/428 |
| 6,665,098 | B1 | * | 12/2003 | Nagarajan ..................... 358/474 |
| 6,734,986 | B1 | * | 5/2004 | Kuroi et al. .................. 358/1.16 |
| 6,836,568 | B1 | * | 12/2004 | Morishita ..................... 382/219 |
| 7,782,500 | B2 | * | 8/2010 | Shiokawa et al. ............. 358/474 |
| 8,199,373 | B2 | * | 6/2012 | Ito ................................. 358/474 |
| 8,248,650 | B2 | * | 8/2012 | Kashiwagi ................... 358/1.16 |
| 8,462,393 | B2 | * | 6/2013 | Kohara et al. ................. 358/446 |
| 8,553,276 | B2 | * | 10/2013 | Kohara et al. ................. 358/1.2 |
| 2004/0223648 | A1 | * | 11/2004 | Hoene et al. .................. 382/218 |
| 2011/0228285 | A1 | * | 9/2011 | Kohara et al. ................. 358/1.2 |
| 2011/0228347 | A1 | * | 9/2011 | Kohara et al. ................. 358/446 |

* cited by examiner

*Primary Examiner* — Negussie Worku
(74) *Attorney, Agent, or Firm* — Staas & Halsey LLP

(57) ABSTRACT

An image forming apparatus and a method of controlling the same capable of preventing an unnecessary repetitive performance of a scan task by sensing in advance a succeeding scan command generated with respect to a document which has already been scanned and using a previous scan result without an additional scan task are provided. The method includes generating and storing a first image through a first scan task according to a first scan command, determining whether a document at the first scan task is replaced by a new document using document sensors if a second scan command is generated, and using the first image as a result of the second scan command without performing a second scan task according to the second scan command upon determining that the document at the first scan task is not replaced by the new document.

17 Claims, 16 Drawing Sheets

FIG. 16A

INPUT ID AND PASSWORD.

ID:_
PASSWORD:

YOU ARE LOGGED IN.
YOU ARE PERMITTED TO DO DESIRED TASKS.

ADDITIONAL LOGIN IS REQUIRED.
INPUT ID AND PASSWORD.

ID:_
PASSWORD:

PRE-SCAN RESULT IS MATCHED.
CONTINUE SCANNING?

| FIRST PRE-SCAN IMAGE | SECOND PRE-SCAN IMAGE |

~202

US 9,131,095 B2

IMAGE FORMING APPARATUS AND METHOD OF CONTROLLING THE SAME

CROSS-REFERENCE TO RELATED APPLICATIONS

This application is related to, and claims the priority benefit of Korean Patent Application No. 10-2013-0116078, filed on Sep. 30, 2013 in the Korean Intellectual Property Office, the disclosure of which is incorporated herein by reference.

BACKGROUND

1. Field

Embodiments relate to an image forming apparatus, and more particularly to an image forming apparatus equipped with a scanning device to generate an image of a document by scanning the same. An image forming apparatus may be a scanner, a multi-function printer including a scanning device, or a copier having a scanning function.

2. Description of the Related Art

A scanner as a representative image forming apparatus scans an image of a document and converts the scanned image into a digital image. Multi-function printers having multiple functions of scanning, printing, faxing and the like, and copiers having a similar operational principle to scanners to copy a document have been developed, image forming apparatuses are being used for various purposes.

However, time necessary for high-definition color printing or large-sized document scanning may be long. When scanners, multi-function printers or copiers are used in common, a long scanning time may negatively affect many users. In addition, repeated scanning performance for the same document causes unnecessary waste of power or delay due to memory buffering.

SUMMARY

It is an aspect to provide an image forming apparatus and a method of controlling the same capable of preventing an unnecessary repetitive performance of a scan task by sensing in advance a succeeding scan command generated with respect to a document that has already been scanned and using a previous scan result without an additional scan task.

Additional aspects of the invention are set forth in part in the description which follows and, in part, will be obvious from the description, or may be learned by practice of the invention.

In accordance with an aspect of an embodiment, a method of controlling an image forming apparatus includes generating and storing a first image through a first scan task according to a first scan command, determining whether a document at the first scan task is replaced by a new document using document sensors if a second scan command is generated, and using the first image as a result of the second scan command without performing a second scan task according to the second scan command upon determining that the document at the first scan task is not replaced by the new document.

The determining may include sensing presence of the document and a size of the document using the document sensors, and determining whether the document is replaced based on sensing results of the presence and size of the document.

The method may include generating a second image by performing a second scan task with respect to the new document upon determining that the document at the first scan task is replaced by the new document.

The method may include deleting the first image from a storage unit before scanning the new document upon determining that the document at the first scan task is replaced by the new document.

The method may include receiving a first user's ID and password through a first user login before generating the first scan command.

The method may include receiving a second user's ID and password through a second user login before generating the second scan command.

The method may include checking whether to use the first image as a result of the second scan command without performing a second scan task according to the second scan command upon determining that the document at the second scan task is not replaced by the new document.

In accordance with an aspect of an exemplary embodiment, a method of controlling an image forming apparatus includes generating and storing a first pre-scan image and a first main scan image through a first scan task according to a first scan command, generating and storing a second pre-scan image through a second scan task according to a second scan command, determining whether a document at the first scan task is replaced by a new document for the second scan task by comparing the first pre-scan image with the second pre-scan image, and using the first main scan image as a result of the second scan command without performing the second scan task according to the second scan command upon determining that the document at the first scan task is not replaced by the new document.

The determining may include determining that the document at the first scan task is not replaced by the new document if the first pre-scan image and the second pre-scan image are the same.

The method may include generating a second main scan image by performing the second scan task with respect to the new document upon determining that the document at the first scan task is replaced by the new document.

The method may include deleting the first main scan image from a storage unit before scanning the new document upon determining that the document at the first scan task is replaced by the new document.

The method may include receiving a first user's ID and password through a first user login before generating the first scan command.

The method may include receiving a second user's ID and password through a second user login before generating the second scan command.

The method may include checking whether to use the first main scan image as a result of the second scan command without performing the second scan task according to the second scan command upon determining that the document at the second scan task is not replaced by the new document.

The method may include displaying the first pre-scan image and the second pre-scan image on a display unit upon determining that the document at the second scan task is not replaced by the new document.

In accordance with an aspect of an exemplary embodiment, a method of controlling an image forming apparatus includes determining whether a document at a previous scan task and a document at a current scan task are the same, and using a document scan image generated from the previous scan task as a document scan image of the current scan task without performing a new scanning process for the current scan task upon determining that the document at the previous scan task and the document at the current scan task are the same.

In accordance with an aspect of an exemplary embodiment, an image forming apparatus includes a scanning device to scan a document, a manipulation device to generate a first scan command and a second scan command, a storage unit to store a first pre-scan image and a first main scan image generated from a first scan task according to the first scan command and a second pre-scan image generated from a second scan task according to the second scan command, a display unit to display the first pre-scan image and the second pre-scan image, and a control unit to determine whether a document at the first scan task is replaced by a new document for the second scan task by comparing the first pre-scan image with the second pre-scan image, and control the scanning device so as to use the first main scan image as a result of the second scan command without performing the second scan task according to the second scan command upon determining that the document at the first scan task is not replaced by the new document.

Since an unnecessary repetitive performance of a scan task is prevented, a time taken to perform a scan task is reduced and use of the apparatus is minimized, thereby achieving lifespan extension of the apparatus.

BRIEF DESCRIPTION OF THE DRAWINGS

These and/or other aspects of the invention will become apparent and more readily appreciated from the following description of the embodiments, taken in conjunction with the accompanying drawings of which:

FIGS. 16A-16D are exemplary views illustrating a user interface displayed on a display unit in a method of controlling an image forming apparatus illustrated in FIG. 15.

DETAILED DESCRIPTION

Figure 1:
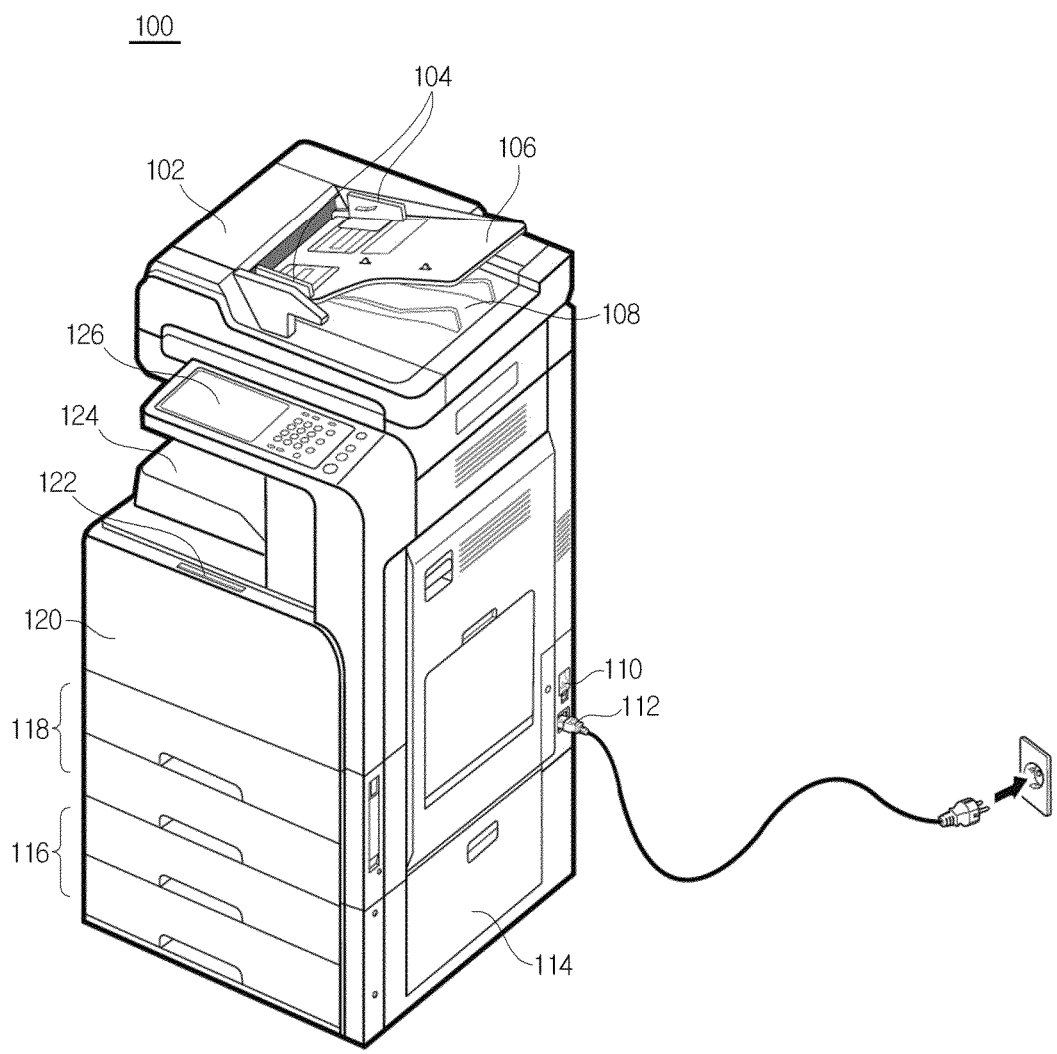
FIG. 1 is a view illustrating an image forming apparatus according to an embodiment.

Reference will now be made in detail to the embodiments, examples of that are illustrated in the accompanying drawings, wherein like reference numerals refer to like elements throughout.

FIG. 1 is a view illustrating an image forming apparatus according to an embodiment. An external appearance of an image forming apparatus 100 according to an embodiment will be described with reference to FIG. 1.

An image forming apparatus 100 comprises a cover 102 provided at an upper portion thereof. The cover 102 may be configured to cover a flat glass (refer to 310 in FIG. 3) disposed therebelow. The cover 102 may be replaced by an automatic document feeder. The image forming apparatus 100 illustrated in FIG. 1 includes an automatic document feeder, which serves as the cover. The automatic document feeder feeds a large number of documents to the image forming apparatus 100 sheet by sheet. For example, when scanning, copying or faxing a large number of documents, the document may be rapidly fed to the image forming apparatus 100 by the automatic document feeder. Such an automatic document feeder includes a document width guide 104, a document input tray 106 and a document output tray 108. The document width guide 104 guides both sides (in a main-scanning direction) of a document to be fed so that the document is smoothly fed into the image forming apparatus 100 in a designated direction. The document input tray 106 may be configured to receive a document to be fed into the image forming apparatus 100. The document received on the document input tray 106 may be fed into the image forming apparatus 100 by operation of a document pickup device and rollers. The document output tray 108 may be configured to receive the document that is discharged from the image forming apparatus 100 after being fed into the image forming apparatus 100 from the document input tray 106 and undergoing a scanning process in the image forming apparatus 100.

A power switch 110 may be provided, for example, at a right side portion of the image forming apparatus 100. The power switch 110 allows commercial AC power of 110V or 220V supplied through a power cord 112 to be converted in phase, voltage and frequency through a power supply unit of the image forming apparatus 100 and supplied to each electronic component of the image forming apparatus 100.

A second cassette feeder cover 114 may be provided at a side portion of a second cassette feeder 116. In addition to a main cassette feeder 118 provided at the image forming apparatus 100 to contain standard size paper, the second cassette feeder 116 may be selectively added. Both the main cassette feeder 118 and the second cassette feeder 116 considerably increase paper capacity.

A front cover 120 may be provided at a front portion of the image forming apparatus 100. The front cover 120 may be opened when performing maintenance on a laser scanning unit, a waste toner box, a toner cartridge, an imaging unit and the like. The front cover 120 may be opened, for example, using a front cover knob 122.

A paper output tray 124 may be configured to receive paper that is discharged from the image forming apparatus 100 after an image is printed thereon.

A manipulation device 126 includes a display unit, a status LED and a key input unit. The key input unit includes a plurality of number buttons, function buttons, menu buttons and command buttons.

Figure 2:
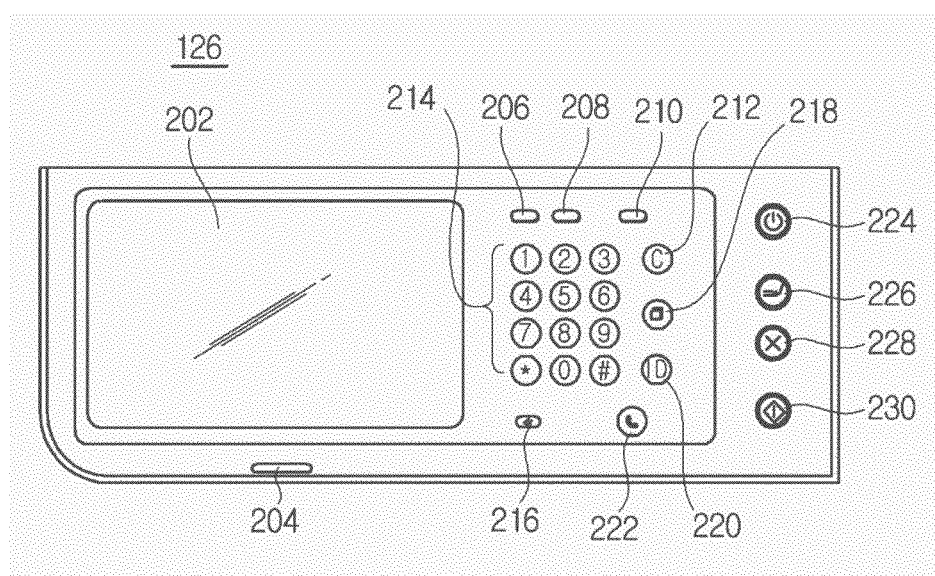
FIG. 2 is a view illustrating a manipulation device of an image forming apparatus according to an embodiment.

FIG. 2 is a view illustrating a manipulation device of an image forming apparatus according to an embodiment. As illustrated in FIG. 2, the manipulation device 126 includes a display unit 202, a status LED 204, an operation status button 206, a counter button 208, a security mode button 210, a delete button 212, a number button 214, a return button 216, a redial/pause button 218, a login/logout button 220, an on hook dial button 222, a power button 224, an urgent copy button 226, a stop button 228 and a start button 230.

The display unit 202 may be configured to display a current status of the image forming apparatus 100 and a screen demanding a user's response during the operation. A user may set an operational menu through the display unit 202.

The status LED 204 may be configured to display a current status of the image forming apparatus 100 by change in color and flickering. An exemplary difference between the display unit 202 and the status LED 204 is the display unit 202 displays concrete status information and provides two-way communication with a user, but the status LED 204 simply and unilaterally displays a status of the image forming apparatus 100, for example, by change in color and flickering.

In response to user manipulation, the operation status button 206 displays currently performed tasks, pending tasks, completed tasks, error codes or security tasks on the display unit 202.

In response to user manipulation, the counter button 208 displays the accumulated number of sheets of paper that have been used in the image forming apparatus 100 until the present time.

The security mode button 210 performs a security mode for generation/certification of a secure document.

The delete button 212, in response to user manipulation, deletes characters, numbers and symbols in an editing area. For example, if a user inputs the wrong number of sheets of paper to be copied, the user may use the delete button 212 to correct this. In addition, if a user inputs the wrong fax number, the user may use the delete button 212 to correct this.

Using the number button 214, a user enters a phone or fax number or inputs other numbers or characters. A user may input the number of sheets of paper to be printed or numbers for other options through the number button 214.

The return button 216, in response to user manipulation, initializes the present setting of the image forming apparatus 100. For example, when the number of copies and copy concentration have been set to a certain value in a copy mode, if a user presses the return button 216, the number of copies is initialized to zero and the copy concentration is initialized to a median value.

The redial/pause button 218, in response to user manipulation, redials the most recently dialed fax number or received fax number in a standby mode or insert a pause (-) into a fax number in an edit mode.

The login/logout button 220, in response to user manipulation, allows a user to log in to the image forming apparatus 100 or to log out of the image forming apparatus 100.

The on hook dial button 222, in response to user manipulation, makes a dial tone sound from a speaker.

The power button 224 allows a user to turn the image forming apparatus 100 on or off. If the light of the status LED 204 is blue, the power of the image forming apparatus 100 is in an on state. If a user wants to turn off the image forming apparatus 100, the user presses the power button 224 for about three seconds or more.

If a user presses the urgent copy button 226, the currently performed task may be interrupted to perform urgent copy.

The stop button 228, in response to user manipulation, stops the currently performed task. So that a user can select stop or restart, a pop-up window showing information regarding the currently performed task is displayed on the display unit 202.

The start button 230, in response to user manipulation, starts the currently set task.

Figure 3:
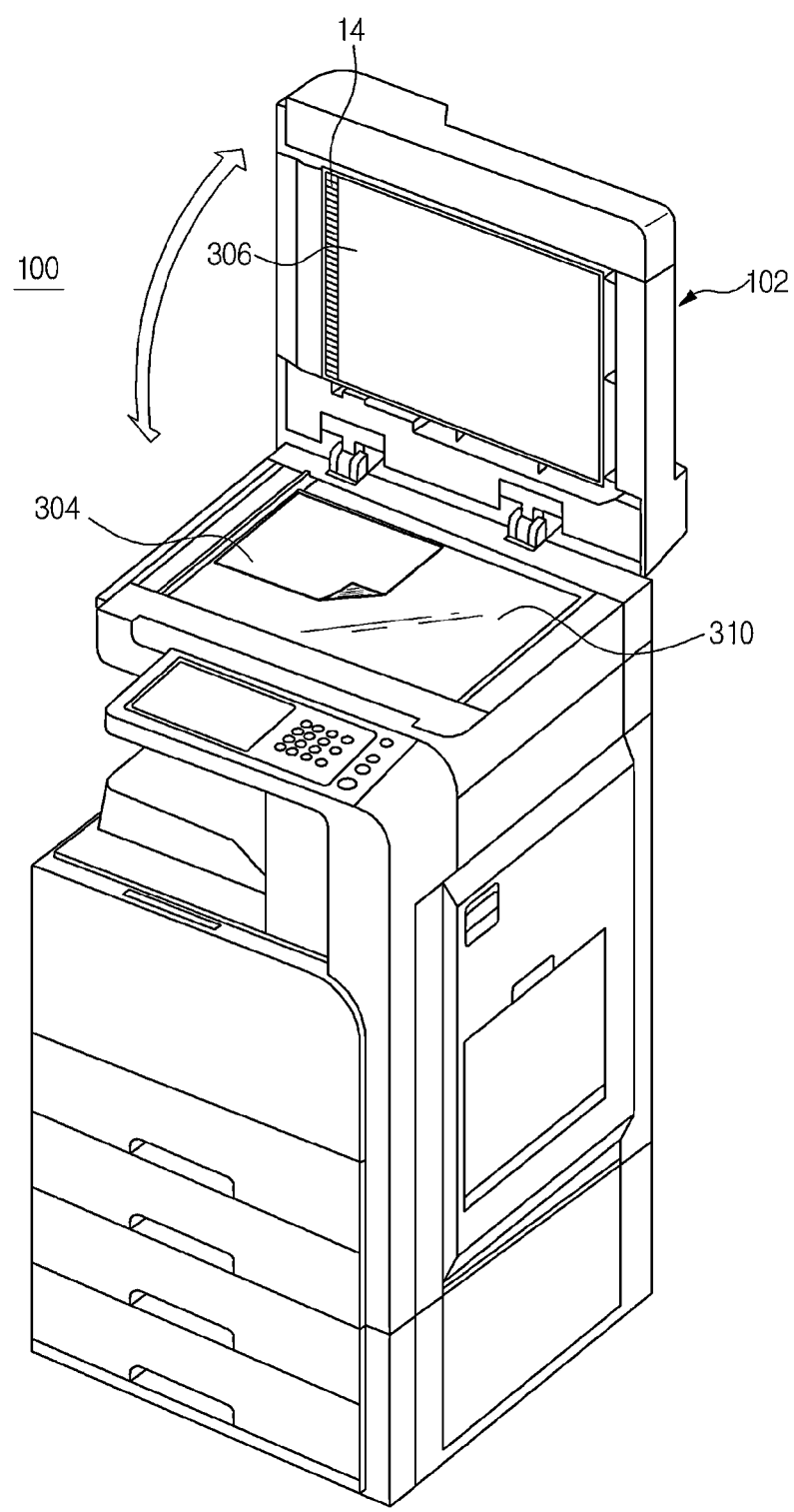
FIG. 3 is a view illustrating a cover-open state and a document-loaded state in an image forming apparatus according to an embodiment.

FIG. 3 is a view illustrating a cover-open state and a document-loaded state in the image forming apparatus according to an embodiment. As illustrated in FIG. 3, with the cover (automatic document feeder) 102 open, a document 304 may be loaded at a designated position on the flat glass 310. A recording surface of the document 304 faces the surface of the flat glass 310. A white sheet 306 of the cover 102 may make a space around the document 304 white when the document 304 is read. The white sheet 306 may be provided with a mark pattern 14 that has a band shape extending longitudinally in a main-scanning direction and on which plural white bars and black bars are alternately printed.

Figure 4:
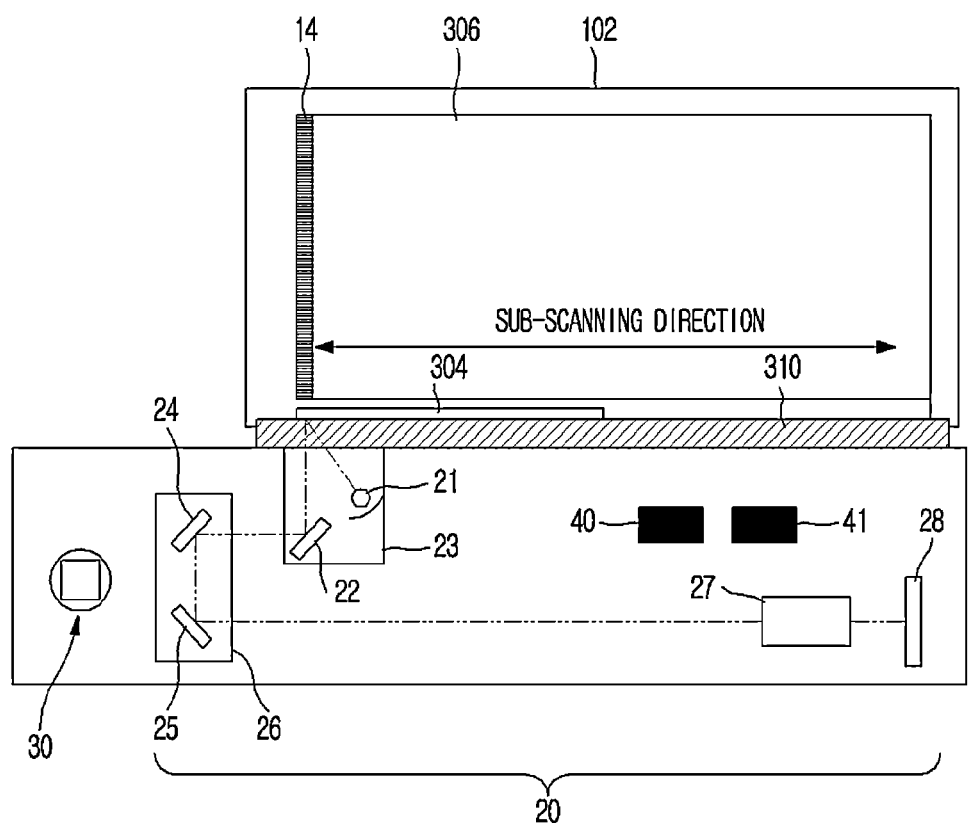
FIG. 4 is a view illustrating a front of an image forming apparatus according to an embodiment.
Figure 5:
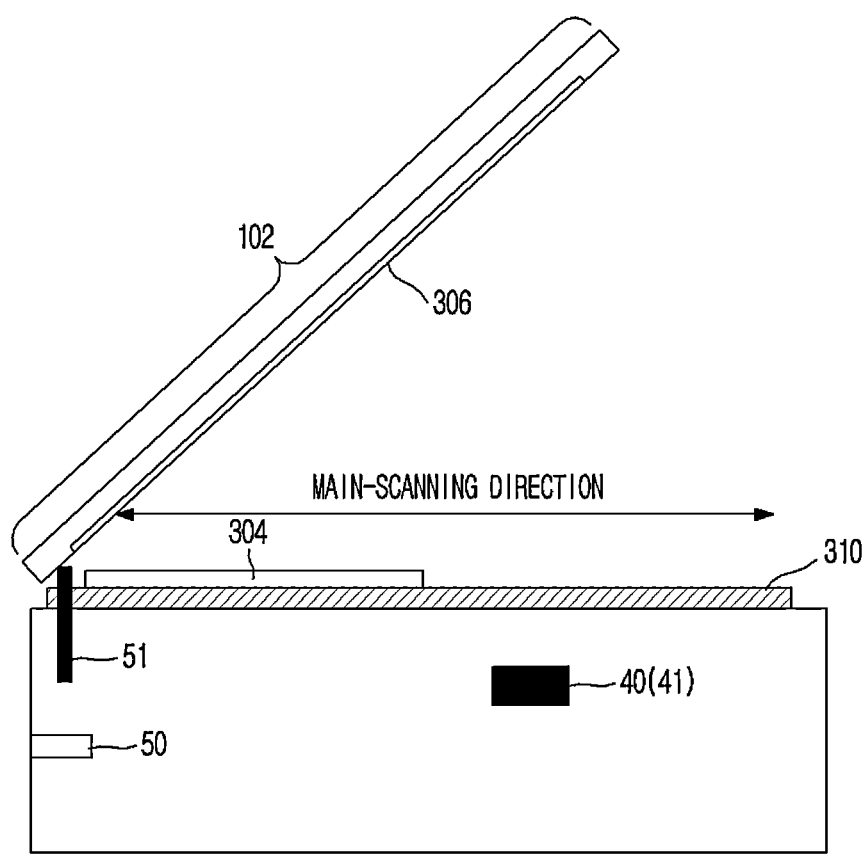
FIG. 5 is a view illustrating a side of an image forming apparatus according to an embodiment.

FIG. 4 is a view illustrating a front of the image forming apparatus according to an embodiment. FIG. 5 is a view illustrating a side of the image forming apparatus according to an embodiment. As illustrated in FIGS. 4 and 5, a main body 10 of the image forming apparatus according to an embodiment includes a cover sensing device 50, a scanning device 20, a driving motor 30 and document sensors 40 and 41.

The cover sensing device 50 outputs a signal when the cover 102 is opened by a predetermined angle or more (for example, 80 degrees or more). The cover sensing device 50 outputs a signal when the cover 102, which has been opened by the predetermined angle or more (for example, 80 degrees or more), is closed. The cover sensing device 50 includes a photo sensor 50 and a sensor flag 51. The sensor flag 51 may be moved upward or downward by opening or closing operation of the cover 102. The sensor flag 51 may be gradually pressed down as the cover 102 is closed, and is released when the cover 102 is opened. The upward or downward movement of the sensor flag 51 selectively intercepts light to be transmitted to the photo sensor 50, allowing the photo sensor 50 to sense closing of the cover 102. Document size may be determined by sensing the width and length of the document 304 placed on the flat glass 310 when the cover 102 is closed.

The scanning device 20 may be provided at a backside (i.e., the opposite side to the surface on which the document 304 is placed) of the flat glass 310. The scanning device 20 includes a light source 21 to irradiate light to the document 304, a plurality of mirrors 22, 24 and 25 to reflect the light reflected from the document 304, a lens 27 to condense the light reflected from the mirrors 22, 24 and 25, and an image sensor 28 to convert the light condensed by the lens 27 into electrical signals. Accordingly, the light reflected from the document 304 may be sequentially reflected by first, second and third mirrors 22, 24 and 25 and then, condensed to the lens 27, thereby being introduced into the image sensor 28 mounted to a circuit board.

The light source 21 and the first mirror 22 may be mounted on a first optical carrier 23, and the second mirror 24 and the third mirror 25 may be mounted on a second optical carrier 26. The first optical carrier 23 and the second optical carrier 26 are movable with respect to the flat glass 310 in a sub-scanning direction. The first optical carrier 23 and the second optical carrier 26 may be reciprocally moved in the sub-scanning direction by the driving motor 30.

The image sensor 28 may be fixed at a preset position. All elements of the scanning device 20 may be integrated into a module to be reciprocally moved with respect to the flat glass 310 in the sub-scanning direction.

The light source 21 may be a lamp to irradiate light to the document.

The image sensor 28 may be a Charge Coupled Device (CCD) or Contact Image Sensor (CIS) to convert optical signals obtained via document scanning into electrical signals. The image sensor 28 may be installed parallel to the flat glass 310 and is longitudinally arranged in a main-scanning direction. During document reading, the image sensor 28 receives light when the light irradiated from the light source 21 is reflected by the document 304, and outputs electrical signals depending on a received quantity of light. When the light irradiated from the light source 21 is reflected by the document 304, the reflected light is again reflected by the first mirror 22 to the third mirror 25 and then is condensed by the lens 27 to thereby be transmitted to the image sensor 28. The first optical carrier 23 and the second optical carrier 26 may be moved in the sub-scanning direction during document reading, allowing the image sensor 28 to produce an image data corresponding to an image of the document 304. The image data produced by the image sensor 28 may be transmitted to a control unit 60. The control unit 60 recognizes the image data as an image to be formed.

The document sensors 40 and 41 are provided to sense the presence of the document 304, and to determine the length of the document 304 placed on the flat glass 310. The document sensors 40 and 41 include a reflection type photo sensor having a light emitting element to irradiate light toward the document 304 through the flat glass 310 and a light receiving element to receive the light reflected from the document 304.

When the document 304 is placed on an area of the flat glass 310 corresponding to the installation positions of the document sensors 40 and 41, the light emitted from the light emitting element is reflected by the document 304, so that the light receiving element receives most of the reflected light. However, when the document 304 is not placed on an area of the flat glass 310 corresponding to the installation positions of the document sensors 40 and 41, the light emitted from the light emitting element may be reflected in a direction away from the light receiving element, so that the light receiving element receives a reduced quantity of light. Accordingly, the presence of the document 304 may be sensed based on a difference in the received quantity of light. Although FIG. 4 illustrates two document sensors 40 and 41, three or more sensors may be arranged below the flat glass 310 at positions corresponding to different document lengths. Using the document sensors 40 and 41, the size of the document 304, the presence of the document 304 and the replacement of the document 304 may be determined. If the size of the document 304 is detected, the presence of the document 304 is also determined. If a change of the size of the document 304 by replacement of the same is detected, the replacement of the document 304 is also determined.

Figure 6:
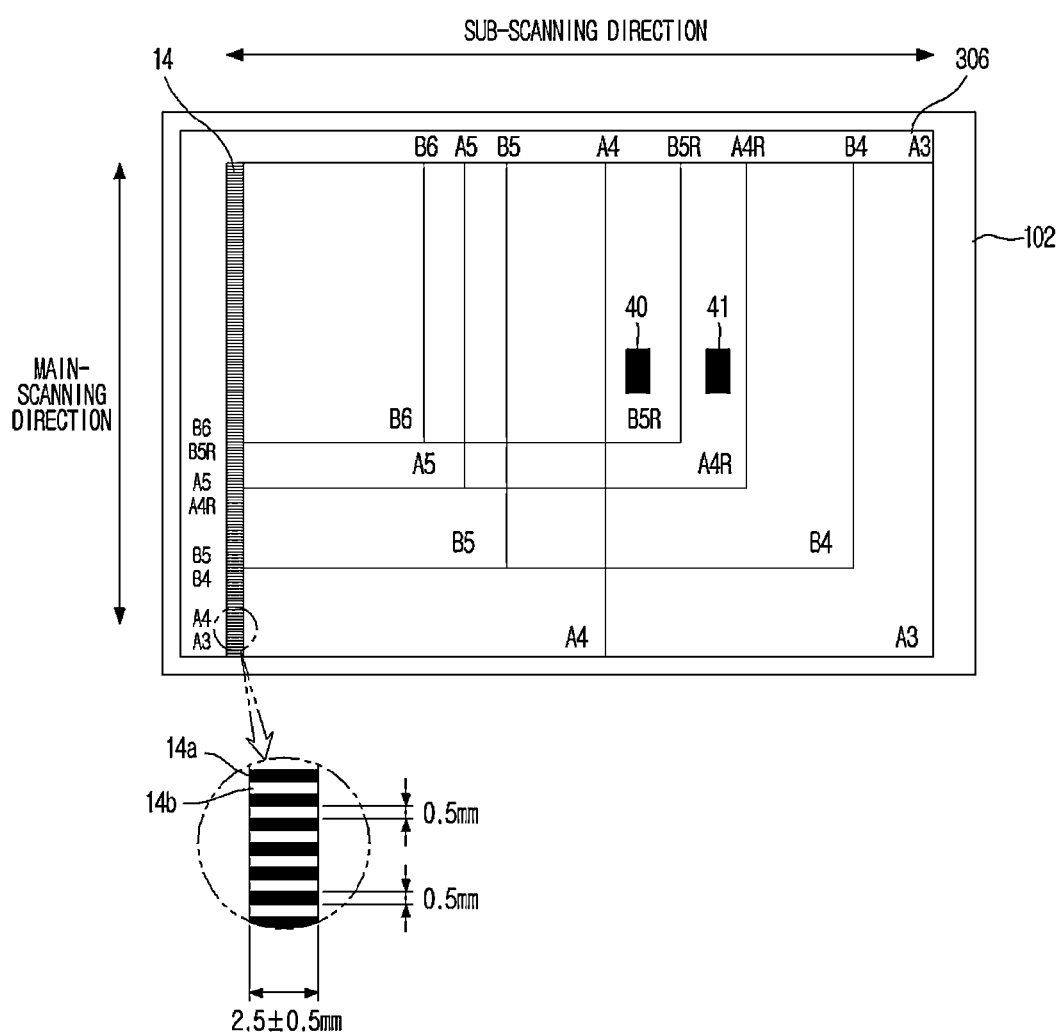
FIG. 6 is a view illustrating a mark pattern provided at a white sheet and a document width corresponding to the mark pattern in an image forming apparatus according to an embodiment.

FIG. 6 is a view illustrating the mark pattern 14 provided at the white sheet 306 and a document width corresponding to the mark pattern 14 in the image forming apparatus according to an embodiment. As illustrated in FIG. 6, the flat glass 310 is marked at an outer periphery thereof with document size labels that represent standard document sizes, such as B6, A5, B5, A4, B5R, A4R, B4 and A3. This allows a user to accurately place the document 304 at a position suitable for the size of the document 304 with reference to the document size labels. FIG. 6 illustrates an example of placing B6, A5, B5, A4, B5R, A4R, B4 and A3 documents on the flat glass 310.

In an operation to sense the size of the document 304, the width of the document 304 may be sensed using the mark pattern 14 that is formed at the white sheet 306 to correspond to the document width, and the length of the document 304 is sensed using the document sensors 40 and 41 that are arranged on a per document length basis.

If a user places the document 304 on the flat glass 310 with reference to the document size labels, the document sensor 40 senses the presence of the document 304, thus determining the length of the document 304. In an example, assuming that the first document sensor 40 is installed at a position corresponding to a B5R size and the second document sensor 41 is installed at a position corresponding to an A4R size, if the first document sensor 40 senses "No Document" and the second sensor 41 senses "No Document", it is determined that the length of the document 304 corresponds to any one of B6, A5, B5 and A4 sizes. If the first document sensor 40 senses "Document Ready" and the second document sensor 41 senses "No Document", it is determined that the length of the document 304 corresponds to a B5R size. If the first document sensor 40 senses "Document Ready" and the second document sensor 41 senses "Document Ready", it is determined that the length of the document 304 corresponds to any one of A4R, B4 and A3 sizes.

The mark pattern 14, which is formed on the white sheet 306 to sense the width of the document 304 placed on the flat glass 310, is printed in the main-scanning direction on a region of the white sheet 306 corresponding to a front end of the document 304. For example, the mark pattern 14 includes black bars 14*a* and white bars 14*b* (or gray bars), which are printed to have preset equal widths (for example, 2.5±0.5 mm) and preset equal heights (for example, 0.5 mm) within a scan masking region range (for example, 4 mm or less). The mark pattern 14 may be configured such that the plurality of black bars 14*a* is printed at the same interval within a preset length range. In an example, the mark pattern 14 may be promptly scanned only by a width of about 3 mm from the front end of the document 304.

The first optical carrier 23 of the scanning device 20 may be located at a place corresponding to the mark pattern 14 of the white sheet 306 during document size sensing. The place corresponding to the mark pattern 14 may be a home position of the first optical carrier 23. Accordingly, since it is unnecessary to move the first optical carrier 23 if the place corresponding to the mark pattern 14 of the white sheet 306 is the home position, a document reading operation may promptly begin as soon as the document size is determined, resulting in a reduced image reading time.

An image of the mark pattern 14 formed at the white sheet 306 may be produced during document size sensing. The produced image may be analyzed to determine a time when a repeated pixel value of 0 or 256 changes to the other pixel value (for example, a time when a pixel value of 0 (black) changes to a pixel value of 256 (white)). The length of an image region where the same pixel value is sensed prior to the change time may be determined as the width of the document 304. Since some bars of the mark pattern 14 are hidden by the width of the document 304 when the document 304 is placed on the flat glass 310, the same pixel value of 256 is sensed in the hidden region. After the mark pattern 14 is exposed from behind the width of the document 304, the black bars 14*a* and the white bars 14*b* begin to be alternately revealed so that the pixel value changes in the sequence of 0→256→0→256→0→256→0→256→ . . . . The length of the region where the same pixel value is sensed is determined as the width of the document 304.

Figure 7:
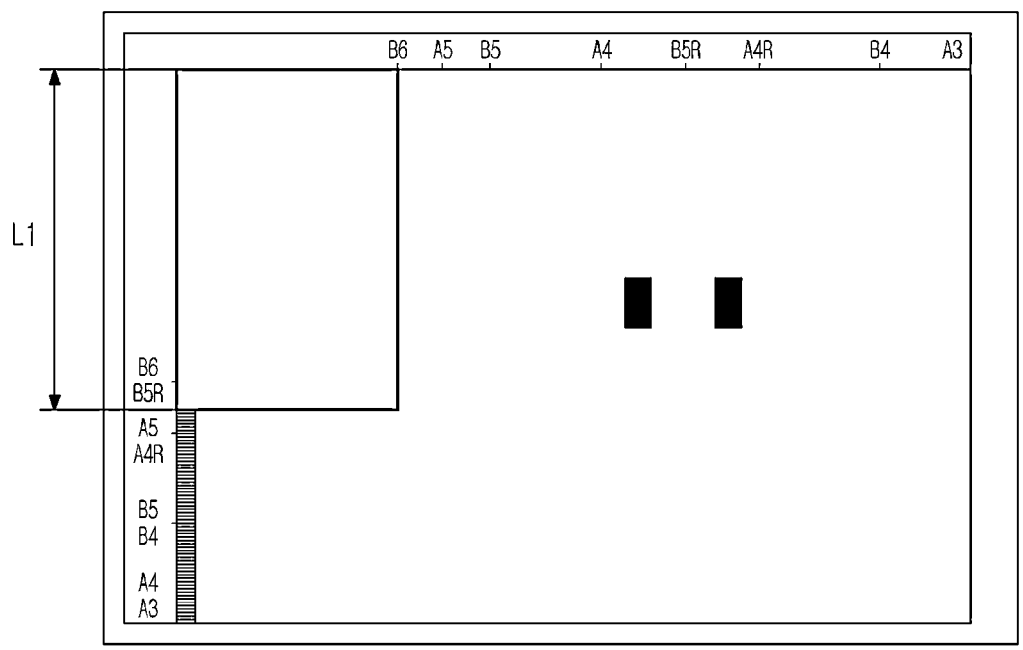
FIGS. 7 and 8 are views illustrating a determination of a first width of a first document in an image forming apparatus according to an embodiment.
Figure 8:
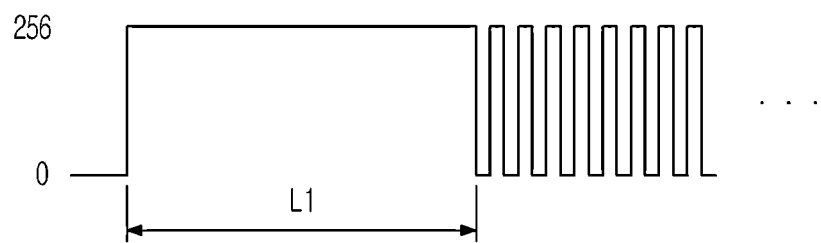
Figure 9:
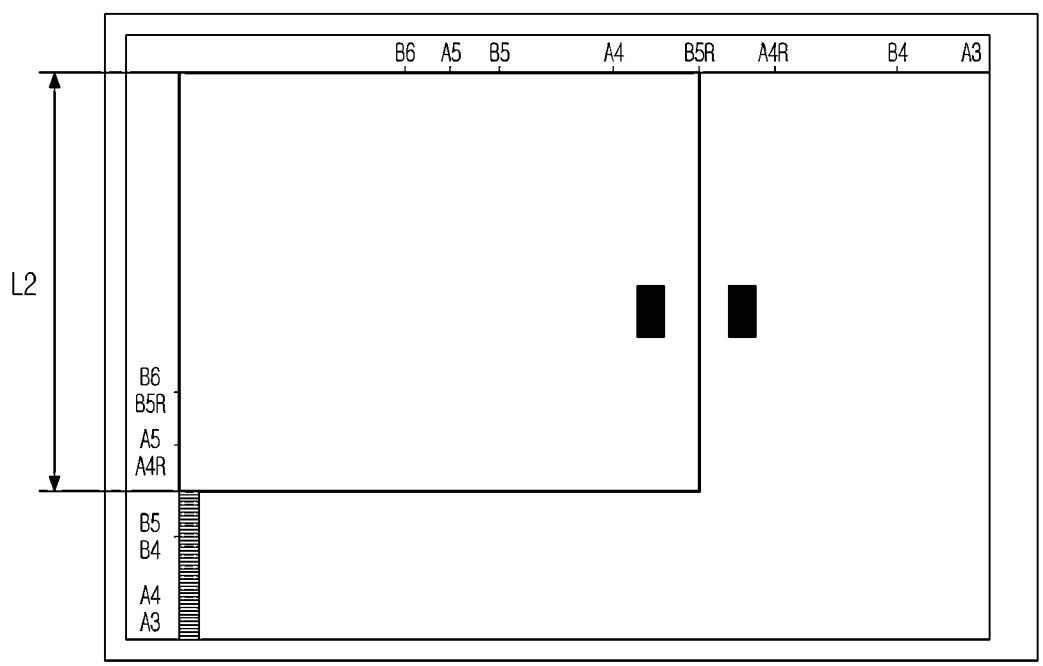
FIGS. 9 and 10 are views illustrating a determination of a second width of a second document in an image forming apparatus according to an embodiment.
Figure 10:
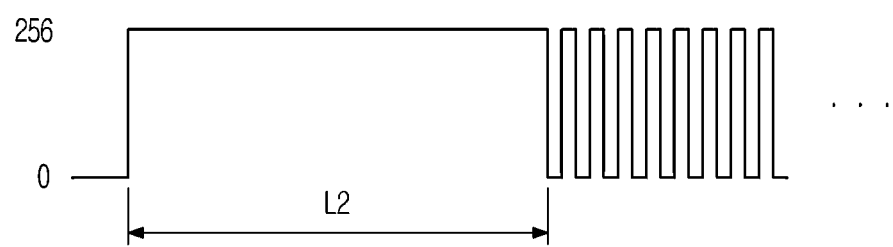

FIGS. 7 and 8 are views illustrating determination of a first width L1 of a first document in the image forming apparatus according to an embodiment. FIGS. 9 and 10 are views illustrating determination of a second width L2 of a second document in the image forming apparatus according to an embodiment.

Referring to FIGS. 7 and 8, an image of a region, where the mark pattern 14 is formed, may be produced and analyzed in the case of a document having a length equal to that of a B6 size and a width L1 greater than that of the B6 size. A constant white pixel value of 256 may be sensed in the range of the document width L1 and then, the pixel value changes in the sequence of 0→256→0→256→0→256→0→256→ . . . following the constant pixel value corresponding to the document width L1. Accordingly, it may be determined that the width of the document 304 is equal to the length of a region where the constant pixel value of 256 is sensed.

Referring to FIGS. 9 and 10, an image of a region, where the mark pattern 14 is formed, may be produced and analyzed in a case of a document having a length equal to that of a B5R size and a width L2 greater than that of the B5R size (L2>L1). A constant white pixel value of 256 may be sensed in the range of the document width L2 and then, the pixel value changes in the sequence of 0→256→0→256→0→256→0→256→ . . . following the constant pixel value corresponding to the document width L2. Accordingly, it may be determined that the width of the document 304 is equal to the length of a region where the constant pixel value of 256 is sensed.

Document size may be determined based on the length and width of the document 304 sensed. In a case where only standard size documents are used, the most similar standard document size may be determined from the sensed length and width of the document (for example, an A5 size is determined in the case of FIG. 7 and a B4 size is determined in the case of FIG. 9). On the other hand, in a case where non-standard size documents are used, document size may be directly determined from the sensed length and width of the document.

Figure 11:
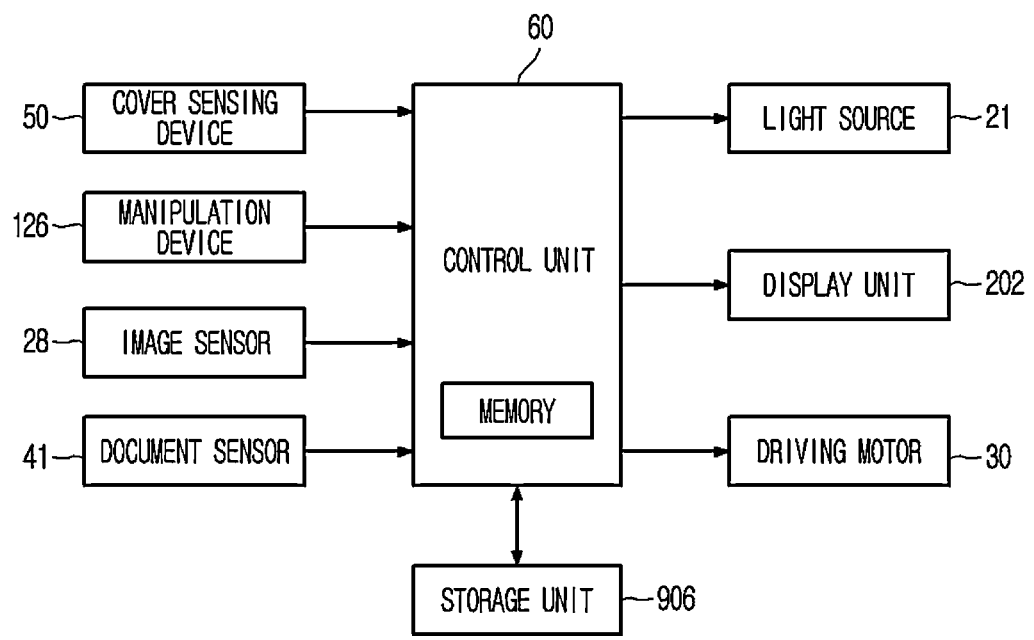
FIG. 11 is a control block diagram of an image forming apparatus according to an embodiment.

FIG. 11 is a control block diagram of the image forming apparatus according to an embodiment. As illustrated in FIG. 11, the image forming apparatus according to an embodiment includes the control unit 60 to perform general control operations. The control unit 60 controls operation of the cover sensing device 50, the scanning device 20 and the driving motor 30. The control unit 60 senses operation of the cover sensing device 50, thus recognizing opening or closing of the cover 102. The control unit 60 automatically determines document size by sensing the width and length of the document 304 based on outputs from the image sensor 28 of the scanning device 20 and outputs from the document sensors 40 and 41. With reference to the outputs of the image sensor 28, the control unit 60 determines the width of the document that is equal to the length of the image region where the same pixel value is sensed. With reference to the outputs of the document sensors 40 and 41, the control unit 60 determines the length of the document according to whether the document 304 is present at the installed places of the document sensors 40 and 41. The control unit 60 determines closing of the cover 102 using the cover sensing device 50. If closing of the cover 102 is sensed, the control unit 60 controls the driving motor 30 to move the first optical carrier 23 and the second optical carrier 26 of the scanning device 20 in the sub-scanning direction, allowing the first optical carrier 23 having the light source 21 to be automatically moved to a position corresponding to a region of the mark pattern 14 of the white sheet 306. Thereafter, the control unit 60 produces an image of the region of the mark pattern 14 and determines the width of the document according to the length of the image region where the same pixel value is sensed. After determining the width of the document, the control unit 60 returns the first optical carrier 23 to a home position. If the position corresponding to the region where the mark pattern 14 is formed is equal to the home position, it is unnecessary to move the first optical carrier 23. Regardless of closing of the cover 102, the control unit 60 may automatically sense the size of the document 304 in response to another event (for example, manipulation through the manipulation device 126). A storage unit 906 may be provided to store a scan image obtained by scanning the document 304 using the scanning device 20.

Figure 12:
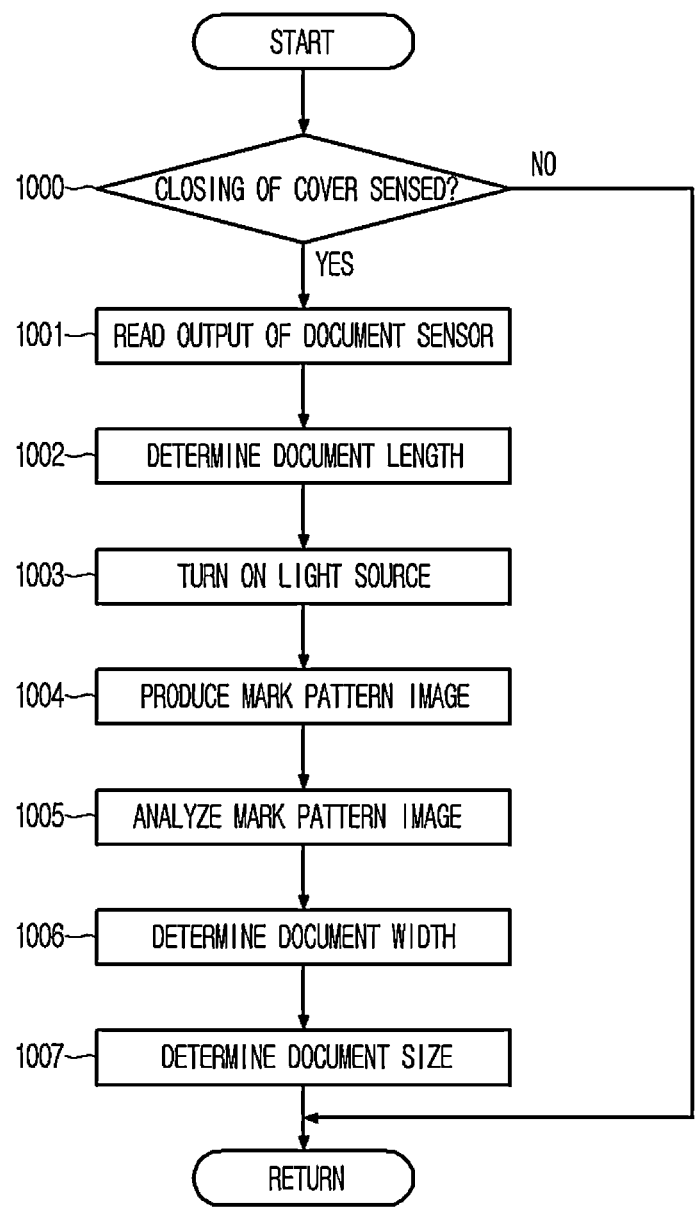
FIG. 12 is a control flowchart illustrating a method of determining document size in an image forming apparatus according to an embodiment.

FIG. 12 is a control flowchart illustrating a method of determining document size in the image forming apparatus according to an embodiment. Referring to FIG. 12, if a user places the document 304 on the flat glass 310 and closes the cover 102 to begin a document reading operation, the control unit 60 recognizes an operational mode of the cover sensing device 50, thus determining whether closing of the cover 102 is sensed at operation 1000. If closing of the cover 102 is sensed, the control unit 60 reads outputs of the document sensors 40 and 41 at operation 1001. The control unit 60 determines the length of the document 304 (in the sub-scanning direction) by reading the outputs of the document sensors 40 and 41 at operation 1002. As illustrated in FIG. 6, assuming that the first document sensor 40 is installed at a position corresponding to a B5R size and the second document sensor 41 is installed at a position corresponding to an A4R size, if the first document sensor 40 senses "No Document" and the second document sensor 41 senses "No Document", the control unit 60 determines that the length of the document 304 corresponds to any one of B6, A5, B5 and A4 sizes. If the first document sensor 40 senses "Document Ready" and the second sensor 41 senses "No Document", the control unit 60 determines that the length of the document 304 corresponds to a B5R size. If the first document sensor 40 senses "Document Ready" and the second sensor 41 senses "Document Ready", the control unit 60 determines that the length of the document 304 corresponds to any one of A4R, B4 and A3 sizes.

According to an embodiment, simultaneously with determination of the document length, the control unit 60 controls the driving motor 30 to move the first optical carrier 23 having the light source 21 of the scanning device 20 to a position corresponding to a region where the mark pattern 14 is formed. If an initial position of the first optical carrier 23 is equal to the position corresponding to the region where the mark pattern 14 is formed, it may be unnecessary to move the first optical carrier 23. After moving the first optical carrier 23, the control unit 60 turns on the light source 21 to scan the region where the mark pattern 14 is formed at operation 1003. The light emitted from the light source 21 is irradiated to the region where the mark pattern 14 is formed, and the light reflected from the region is introduced into the image sensor 28 by way of the plurality of mirrors 22, 24 and 25 and the lens 27. After turning on the light source 21, the control unit 60 controls the image sensor 28 to produce an image of the region where the mark pattern 14 is formed at operation 1004. After producing the mark pattern image, the control unit 60 analyzes the mark pattern image at operation 1005. Analyzing the mark pattern image entails analyzing pixel values of the mark pattern image, thus dividing the mark pattern image into a region where the same pixel value is sensed and the remaining region where pixel values alternate. A specific region of the mark pattern may be hidden by the document placed on the flat glass, thus preventing the scanning device 20 from sensing the mark pattern. Therefore, the control unit 60 may recognize the remaining region of the mark pattern that is not hidden by the document. The control unit 60 determines the length of the region where the same pixel value is sensed as the width of the document (in the main-scanning direction) based on analyzed results of the mark pattern image at operation 1006. The control unit 60 finally determines document size according to the length and width of the document determined in operation modes 1002 and 1006 at operation 1007.

Figure 13:
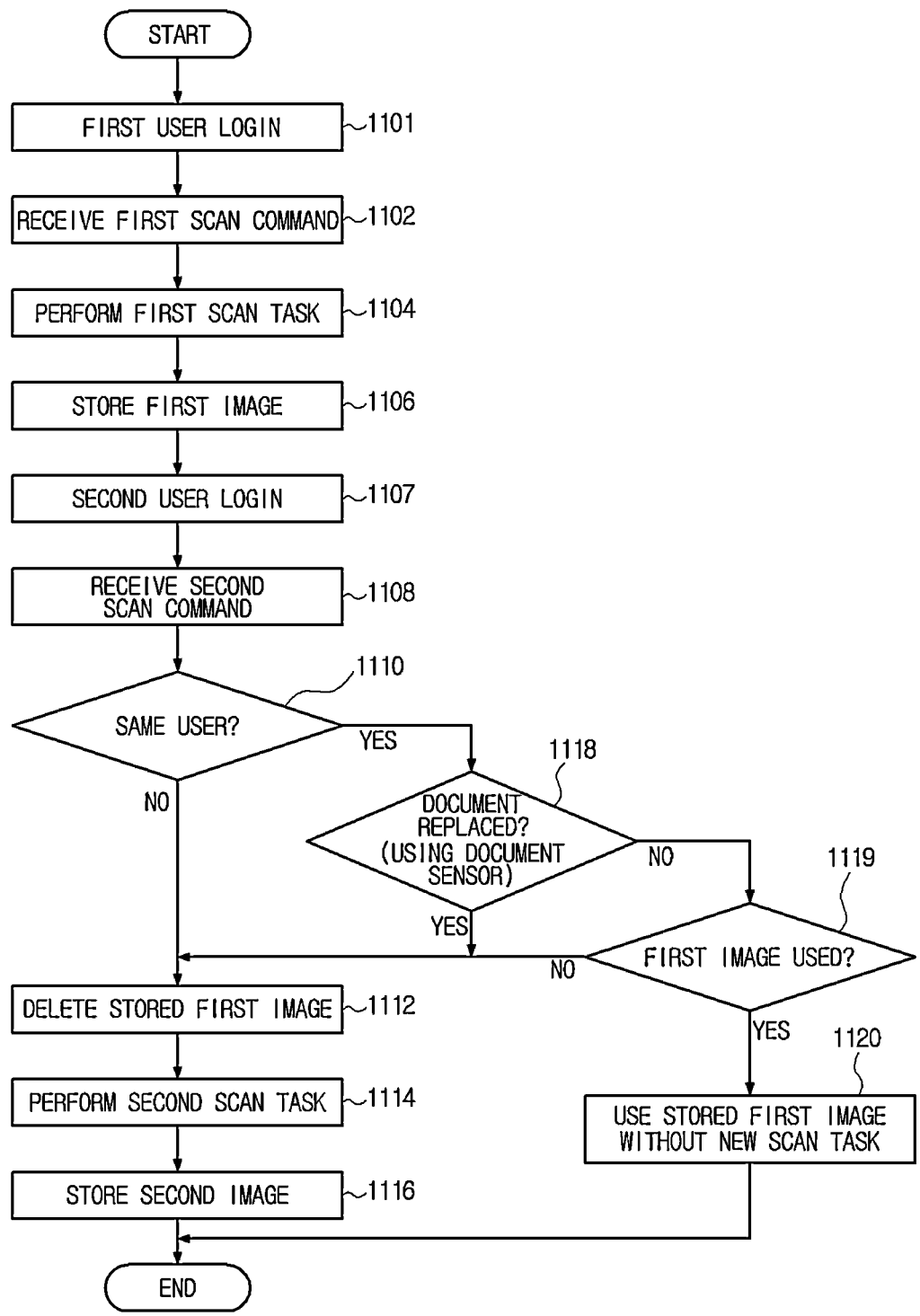
FIG. 13 is a control flowchart illustrating a method of controlling an image forming apparatus according to an embodiment.
Figure 14A:
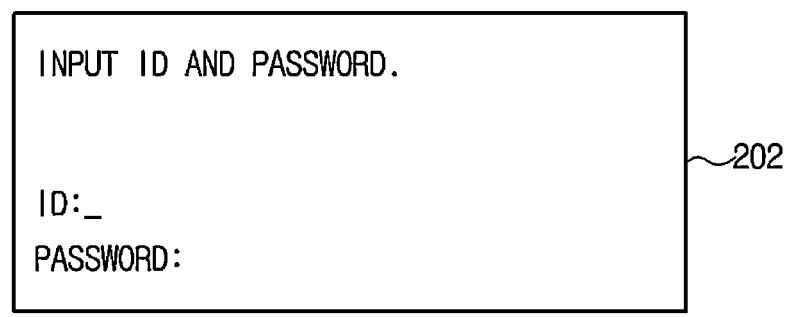
FIGS. 14A-14C are exemplary views illustrating a user interface displayed on a display unit in a method of controlling a image forming apparatus illustrated in FIG. 13.
Figure 14B:
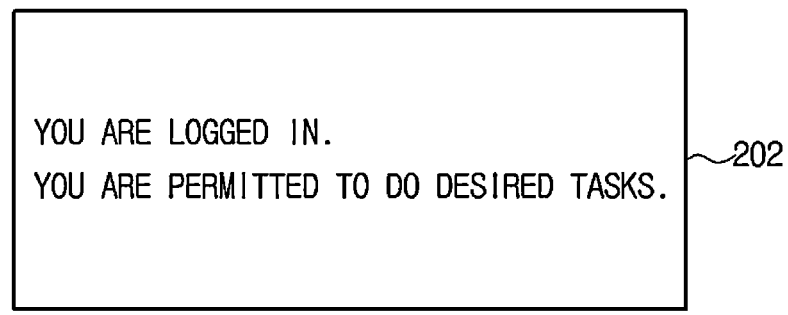
Figure 14C:
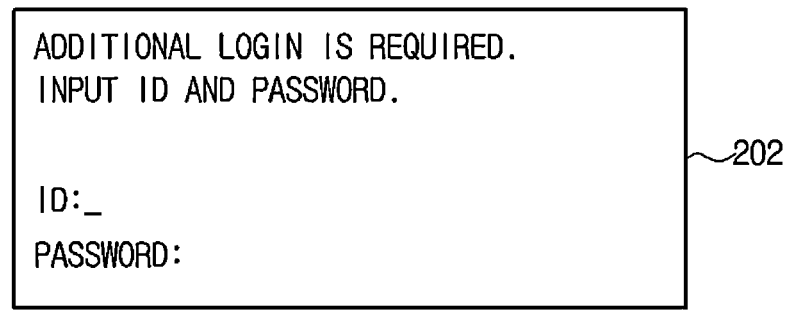

A method of controlling the image forming apparatus according to an exemplary embodiment is described with reference to FIGS. 13 and 14A-14C. FIG. 13 is a control flowchart illustrating a method of controlling the image forming apparatus according to an embodiment, and FIGS. 14A-14C are views illustrating an exemplary user interface displayed on the display unit 202 in the method of controlling the image forming apparatus illustrated in FIG. 13. The method of controlling the image forming apparatus 100 illustrated in FIGS. 13 and 14A-14D may partially or wholly omit a current scan task using information of a previous scan task, thus achieving lifespan extension of the apparatus by reducing a time taken to perform a scan task and minimizing use of the apparatus. In a method of controlling the image forming apparatus illustrated in FIG. 13, it may be determined whether a previous document is replaced by a new document (i.e., whether a previous document is equal to a new document) using the document sensors 40 and 41 and the document size determining method described above with reference to FIG. 12. Replacement of the document 304 includes a case that a previous document placed on the flat glass 310 is replaced by a new document and a case that it is presumed that a previous document is replaced by a new document based on detection of a change in size or position of the document 304.

A first user attempts to log in by manipulating the login/logout button 220 of the manipulation device 126 at operation 1101. In response to the first user manipulation through the login/logout button 220, the control unit 60 displays a message on the display unit 202 to help the first user to input their registered ID and password (see, for example, FIG. 14A). If the first user inputs their ID and password using the manipulation device 126 according to the message, the control unit 60 checks whether the input ID and password are identical to the registered ID and password and whether the input ID and password correctly match. If the ID and password input by the first user are identical to the registered ID and password and also correctly match, the control unit 60 determines that the first user is a qualified user to use the image forming apparatus 100 and allows the first user to use the image forming apparatus 100 (refer to FIG. 14B). The control unit 60 receives a first scan command that the first user generates through the manipulation device 126 at operation 1102. If the first user places the document 304 on the flat glass 310 and generates the first scan command by manipulating the manipulation device 126, the control unit 60 receives the first scan command, and performs a preliminary task necessary to carry out the first scan command. The preliminary task for the first scan command may include moving the first optical carrier 23 and the second optical carrier 26 to an initial position of the document 304 and turning on the light source 21. While moving the first optical carrier 23 and the second optical carrier 26 in the sub-scanning direction, the control unit 60 performs a first scan task corresponding to the first scan command with respect to the document 304 at operation 1104. If the first scan task with respect to the document 304 is completed, the control unit 60 stores a first image, which is a result of the first scan task, in the storage unit 906 at operation 1106.

In the state that the first scan task according to the first scan command is performed and the first image resulted from the first scan task is stored in the storage unit 906, a second user attempts to log in by manipulating the login/logout button 220 of the manipulation device 126 at operation 1107. The control unit 60 displays a message on the display unit 202 to help the second user to input their registered ID and password through the manipulation device 126 (refer to FIG. 14A). If the second user inputs their ID and password using the manipulation device 126 according to the message, the control unit 60 checks whether the input ID and password are identical to the registered ID and password and whether the input ID and password correctly match. If the ID and password input by the second user are identical to the registered ID and password and also correctly match, the control unit 60 determines that the second user is a qualified user to use the image forming apparatus 100 and allows the second user to use the image forming apparatus 100 (refer to FIG. 14B). Security may be maintained through user login demanded at every scan task. Alternatively, an additional task may be permitted without additional login if a predetermined time (for example, 60 seconds) does not pass after the previous scan task is completed, and an additional login process may be demanded if the predetermined time passes (see, for example, FIG. 14C). After the second user logs in, if the second user generates a second scan command using the manipulation device 126, the control unit 60 receives the second scan command and performs a preliminary task necessary to perform the second scan command at operation 1108. Similar to the aforementioned first scan command, the second scan command is generated by the second user manipulation through the manipulation device 126. The previous document may remain or may be replaced by a new document. The terms, "first scan command" and "second scan command", are used to represent a preceding scan command and a succeeding scan command, respectively, of plural scan commands and, may be two successive scan commands of the plural scan commands. The preliminary task for the second scan command may include checking whether the second user is the same as the first user at operation 1110 and checking whether the document is replaced by a new one at operation 1118. The control unit 60 compares the first user's ID logged in before generation of the first scan command with the second user's ID logged in before generation of the second scan command. If the first user's ID and the second user's ID are the same, the control unit 60 determines that the first user and the second user are the same person. If the first user's ID and the second user's ID are not the same, the control unit 60 determines that the first user and the second user are not the same person.

If the first user at the first scan task and the second user at the second scan task are not the same person ("NO" at operation 1110), the control unit 60 deletes the first image, the result of the first scan task, which has been stored in the storage unit 906 at operation 1112, and performs the second scan task corresponding to the second scan command with respect to the document 304 by moving the first optical carrier 23 and the second optical carrier 26 in the sub-scanning direction at operation 1114. The purpose of deleting the first image is to secure the capacity of the storage unit 906. If the previous scan image is kept without being deleted, a storage unit having a very large capacity would be necessary. By deleting the previous scan images, a scan task is sufficiently achieved with a storage unit having a small capacity. Assuming that the storage unit 906 has a sufficient capacity, the control unit 60 may keep the first image without deleting the same, and may permit printing of the first image only if the first user at the first scan task logs in again for security. If the second scan task is completed, the control unit 60 stores a second image resulted from the second scan task in the storage unit 906 at operation 1116.

If the first user at the first scan task and the second user at the second scan task are the same person ("YES" at operation 1110), the control unit 60 determines whether the document 304 on the flat glass 310 remains or is replaced by a new document at operation 1118. It may be determined whether the previous document 304 remains or is replaced by a new document using the document sensors 40 and 41 and the document size determining method described above with reference to FIG. 12. If the previous document 304 is replaced by a new document, the previous document 304 should be moved and accordingly, the document sensors 40 and 41 detect a size and position of the new document. Through this process, replacement by the new document may be sensed. Document size is sensed by the document sensors 40 and 41 that are hidden by the document or revealed. If such a principle of the document sensors 40 and 41 is used, even though the previous document and the new document have the same size, replacement of the document is sensed. This is because removal of the previous document and loading of the new document are sensed by the document sensors 40 and 41 while the previous document is removed from the flat glass 310 and the new document is placed on the flat glass 310.

Upon determining that the previous document is replaced by the new document ("YES" at operation 1118), the control unit 60 deletes the first image, the result of the first scan task, which has been stored in the storage unit 906 at operation 1112, and performs the second scan task corresponding to the second scan command with respect to the document 304 by moving the first optical carrier 23 and the second optical carrier 26 in the sub-scanning direction at operation 1114. If the storage unit 906 has a sufficient capacity, the control unit 60 may keep the first image without deleting the same, and may permit printing of the first image only if the first user at the first scan task logs in again for security. If the second scan task is completed, the control unit 60 stores the second image resulted from the second scan task in the storage unit 906 at operation 1116.

Upon determining that the previous document remains without being replaced by a new document ("NO" at operation 1118), the control unit 60 displays a message on the display unit 202 to ask the user if the user wishes to use the previous first image, and receives a user response at operation 1119. The user response may be achieved by manipulating the manipulation device 126. If the user selects not to use the previous first image ("NO" at operation 1119), the control process proceeds the operations 1112 through 1116, so that the control unit 60 deletes the previous first image and performs the second scan task, thus generating the second image and storing the same. If the user selects to use the previous first image ("YES" at operation 1119), the control unit 60 does not perform a new scan task, and uses the first image, which has already been stored in the storage unit 906, as a result of the second scan task at operation 1120. In other words, when the second user is the same person as the first user ("YES" at operation 1110) and the document 304 is not replaced by a new one ("NO" at operation 1118), it is determined that the document used in the second scan task is the same as the document used in the first scan task. Accordingly, the previous first image may be used as a second image, i.e., the result of the second scan task, without an additional scan task.

Figure 15:
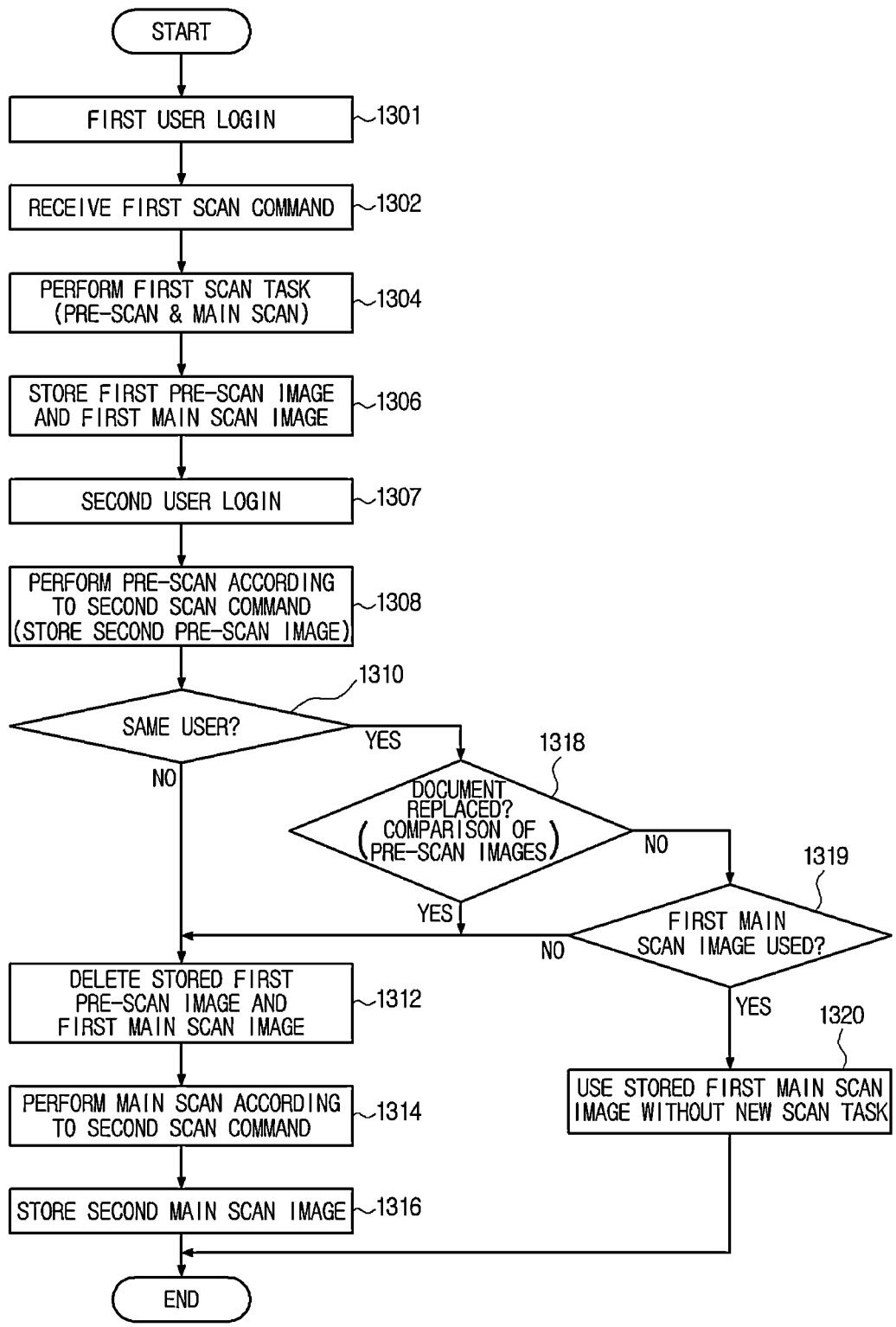
FIG. 15 is a control flowchart illustrating a method of controlling an image forming apparatus according to an embodiment.

A method of controlling the image forming apparatus according to an embodiment is described with reference to FIGS. 15 and 16A-16D. FIG. 15 is a control flowchart illustrating a method of controlling the image forming apparatus according to an embodiment, and FIGS. 16A-16D are views illustrating an exemplary user interface displayed on the display unit 202 in the method of controlling the image forming apparatus illustrated, for example in FIG. 15. The method of controlling the image forming apparatus illustrated in FIGS. 15 and 16A-16D may partially or wholly omit a current scan task using information of a previous scan task, thus achieving lifespan extension of the apparatus by reducing a time taken to perform a scan task and minimizing use of the apparatus. In the method of controlling the image forming apparatus illustrated in FIG. 15, replacement of the document 304 is sensed through comparison of pre-scan images of the document 304. Replacement of the document 304 includes the a case that a previous document placed on the flat glass 310 is replaced by a new document and a case that it is presumed that a previous document is replaced by a new document based on detection of a change in size or position of the document 304.

According to an embodiment, a first user attempts to log in by manipulating the login/logout button 220 of the manipulation device 126 at operation 1301. In response to the first user manipulation through the login/logout button 220, the control unit 60 displays a message on the display unit 202 to help the first user to input their registered ID and password (see, for example, FIG. 16A). If the first user inputs their ID and password using the manipulation device 126 according to the message, the control unit 60 checks whether the input ID and password are identical to the registered ID and password and whether the input ID and password correctly match. If the ID and password input by the first user are identical to the registered ID and password and also correctly match, the control unit 60 determines that the first user is a qualified user to use the image forming apparatus 100 and allows the first user to use the image forming apparatus 100 (see, for example, FIG. 16B). Subsequently, the control unit 60 receives a first scan command that the first user generates through the manipulation device 126 at operation 1302. If the first user places the document 304 on the flat glass 310 and generates the first scan command by manipulating the manipulation device 126, the control unit 60 receives the first scan command, and performs a preliminary task necessary to carry out the first scan command. The preliminary task for the first scan command may include moving the first optical carrier 23 and the second optical carrier 26 to an initial position of the document 304 and turning on the light source 21. While moving the first optical carrier 23 and the second optical carrier 26 in the sub-scanning direction, the control unit 60 performs a first scan task corresponding to the first scan command with respect to the document 304 at operation 1304. The first scan task includes a pre-scan task and a main scan task. The pre-scan task is a process of quickly scanning the document 304 at a lower resolution than a user-set resolution, thereby allowing a user to schematically check the scan result of the document 304. By the pre-scan task, a user may check in advance if the document 304 will be scanned suitably to a user-desired region and direction. The main scan task is a process of scanning the document 304 at a user-desired resolution when it is expected that scanning will be achieved suitably to a user-desired region and direction through the pre-scan task. A first pre-scan image is generated from the pre-scan task, and a first main scan image is generated from the main scan task. If the first scan task with respect to the document 304 is completed, the control unit 60 stores the first pre-scan image and the first main scan image, which are results of the first scan task, in the storage unit 906 at operation 1306.

In the state that the first scan task according to the first scan command is performed and the first image resulted from the first scan task is stored in the storage unit 906, a second user attempts to log in by manipulating the login/logout button 220 of the manipulation device 126 at operation 1307. The control unit 60 displays a message on the display unit 202 to help the second user to input their registered ID and password through the manipulation device 126 (refer to FIG. 16A). If the second user inputs their ID and password using the manipulation device 126 according to the message, the control unit 60 checks whether the input ID and password are identical to the registered ID and password and whether the input ID and password correctly match. If the ID and password input by the second user are identical to the registered ID and password and also correctly match, the control unit 60 determines that the second user is a qualified user to use the image forming apparatus 100 and allows the second user to use the image forming apparatus 100 (see, for example, FIG. 16B). As described above, security may be maintained through user login demanded at every scan task. Alternatively, an additional scan task may be permitted without additional login if a predetermined time (for example, 60 seconds) does not pass after the previous scan task is completed, and an additional login process may be demanded if the predetermined time passes (see, for example, FIG. 16C). After the second user logs in, if the second user generates a second scan command using the manipulation device 126, the control unit 60 receives the second scan command and performs a preliminary task necessary to perform the second scan command at operation 1308. Similar to the aforementioned first scan command, the second scan command is generated by the second user manipulation through the manipulation device 126. The previous document may remain or may be replaced by a new document. The terms, "first scan command" and "second scan command", are used to represent a preceding scan command and a succeeding scan command, respectively, of plural scan commands and, specifically, may be two successive scan commands of the plural scan commands. The preliminary task for the second scan command may include checking whether the second user is the same as the first user at operation 1310 and checking whether the document is replaced by a new one at operation 1318. In detail, the control unit 60 compares the first user's ID logged in before generation of the first scan command with the second user's ID logged in before generation of the second scan command. If the first user's ID and the second user's ID are the same, the control unit 60 determines that the first user and the second user are the same person. If the first user's ID and the second user's ID are not the same, the control unit 60 determines that the first user and the second user are not the same person. Similar to the first scan task, the second scan task includes a pre-scan task and a main scan task. The pre-scan task is a process of quickly scanning the document 304 at a lower resolution than a user-set resolution, thereby allowing a user to schematically check the scan result of the document 304. By the pre-scan task, a user may check in advance if the document 304 will be scanned suitably to a user-desired region and direction. The main scan task is a process of scanning the document 304 at a user-desired resolution when it is expected that scanning will be achieved suitably to a user-desired region and direction through the pre-scan task. A pre-scan image is generated from the pre-scan task, and a main scan image is generated from the main scan task. In the second scan task illustrated in FIG. 15, only the pre-scan task of the second scan task is performed in advance, and the control unit 60 generates a second pre-scan image and stores the same at operation 1309. The main scan task of the second scan task is performed after checking the first and second users and replacement of the document.

If the first user at the first scan task and the second user at the second scan task are not the same person ("NO" at operation 1310), the control unit 60 deletes the first pre-scan image and the first main scan image, the results of the first scan task, which have been stored in the storage unit 906 at operation 1312, and performs the main scan task corresponding to the second scan command with respect to the document 304 by moving the first optical carrier 23 and the second optical carrier 26 in the sub-scanning direction at operation 1314. Assuming that the storage unit 906 has a sufficient capacity, the control unit 60 may keep the first pre-scan image and the first main scan image without deleting the same, and may permit printing of the first pre-scan image and the first main scan image only if the first user at the first scan task logs in again for security. If the main scan task according to the second scan command is completed, the control unit 60 stores a second main scan image produced by the second scan task in the storage unit 906 at operation 1316.

If the first user at the first scan task and the second user at the second scan task are the same person ("YES" at operation 1310), the control unit 60 determines whether the document 304 on the flat glass 310 remains or is replaced by a new document at operation 1318. It may be determined whether the previous document 304 remains or is replaced by a new document by comprising the first pre-scan image generated by the first scan command with the second pre-scan image generated by the second scan command. If the previous document 304 is replaced by a new document, the first pre-scan image and the second pre-scan image are not the same because the first and second pre-scan images are generated from different documents. If the previous document 304 is not replaced by a new document, the first pre-scan image and the second pre-scan image are the same because the first and second pre-scan images are generated from the same document 304. Comparison of the first pre-scan image and the second pre-scan image may be achieved in such a manner that the first pre-scan image and the second pre-scan image are virtually divided into a plurality of predetermined regions and pixel values at the same coordinates in each region are compared. Replacement of the document may be checked by comparison of the first pre-scan image and the second pre-scan image.

Upon determining that the previous document 304 is replaced by the new document ("YES" at operation 1318), the control unit 60 deletes the first pre-scan image and the first main scan image, the results of the first scan task, which have been stored in the storage unit 906 at operation 1312, and performs the main scan task corresponding to the second scan command with respect to the document 304 by moving the first optical carrier 23 and the second optical carrier 26 in the sub-scanning direction at operation 1314. If the storage unit 906 has a sufficient capacity, the control unit 60 may keep the first pre-scan image and the first main scan image without deleting the same, and may permit printing of the first pre-scan image and the first main scan image only if the first user at the first scan task logs in again for security. If the main scan task corresponding to the second scan command is completed, the control unit 60 stores the second main scan image produced by the main scan task in the storage unit 906 at operation 1316.

Upon determining that the previous document remains without being replaced by a new document ("NO" at operation 1318), the control unit 60 displays a message on the display unit 202 to ask the user if the user wishes to use the previous first main scan image, and receives a user response at operation 1319. The user response may be achieved by manipulating the manipulation device 126. If the user selects not to use the previous first main scan image ("NO" at operation 1319), the control process goes to the operations 1312 through 1316, so that the control unit 60 deletes the previous first main scan image and performs the second main scan task, thus generating the second main scan image and storing the same. If the user selects to use the previous first main scan image ("YES" at operation 1319), the control unit 60 does not perform a new scan task, and uses the first pre-scan image and the first main scan image, which have already been stored in the storage unit 906, as results of the second scan task at operation 1320. In other words, when the second user is the same person as the first user ("YES" at operation 1310) and the document 304 is not replaced by a new one ("NO" at operation 1318), it is determined that the document used in the second scan task is the same as the document used in the first scan task. Accordingly, the previous first pre-scan image and the previous first main scan image may be used as the second pre-scan image and the second main scan image, i.e., the results of the second scan task, without an additional scan task. As illustrated in FIG. 16D, more accurate processes may be achieved by outputting a message asking the user if the user wishes to use the previous first main scan image because the pre-scan image (the first pre-scan image) of the previous scan task and the pre-scan image (the second pre-scan image) of the current scan task are the same, or if the user wishes to perform a new main scan task even though the pre-scan image (the first pre-scan image) of the previous scan task and the pre-scan image (the second pre-scan image) of the current scan task are the same.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method of controlling an image forming apparatus, the method comprising:
  receiving a first scan command with respect to a first document;
  performing a first scan task in response to the first scan command;
  storing a first image obtained as a result of the first scan task;
  receiving a second scan command with respect to a second document;
  determining whether the first document is identical to the second document by using a document sensor; and
  using the stored first image as a result of the second scan command without performing a second scan process upon determining that the first document is identical to the second document.

2. The method according to claim 1, wherein:
  at least one of a movement and a size of the first document and the second document is sensed by using the document sensor; and
  whether the first document is identical to the second document is determined based on a result of the sensing.

3. The method according to claim 1, further comprising:
  generating a second image by performing the second scan task with respect to the second document upon determining that the first document is not identical to the second document.

4. The method according to claim 3, further comprising:
  deleting the first image from a storage unit before the scanning of the second document upon determining that the first document is not identical to the second document.

5. The method according to claim 1,
  wherein a first user's ID and password is received through a first user login before the receiving of the first scan command.

6. The method according to claim 1,
  wherein a second user's ID and password is received through a second user login before the receiving of the second scan command.

7. The method according to claim 1, further comprising:
  determining whether to use the first image as a result of the second scan task without performing the second scan task upon determining that the first document is identical to the second document.

8. A method of controlling an image forming apparatus, the method comprising:
  receiving a first scan command with respect to a first document;
  performing a first scan in response to the first scan command, and storing a first pre-scan image and a first main scan image as a result of the first scan task;
  receiving a second scan command with respect to a second document;
  performing a second scan task in response to the second scan command, and storing a second pre-scan image as a result of the second scan task;
  determining whether the first document is identical to the second document by comparing the first pre-scan image with the second pre-scan image; and
  using the stored first main scan image as a result of the second scan command without performing the second scan task upon determining that the first document is identical to the second document.

9. The method according to claim 8, wherein it is determined that the first document is identical to the second document if the first pre-scan image is the same as the second pre-scan image.

10. The method according to claim 8, further comprising:
  generating a second main scan image by performing the second scan task with respect to the second document upon determining that the first document is identical to the second document.

11. The method according to claim 10, further comprising:
  deleting the first main scan image from a storage unit before the scanning of the second document upon determining that the first document not identical to the second document.

12. The method according to claim 8,
  wherein a first user's ID and password is performed through a first user login before the receiving of the first scan command.

13. The method according to claim 8,
  wherein a second user's ID and password is performed through a second user login before the receiving of the second scan command.

14. The method according to claim 8, further comprising:
  determining whether to use the first main scan image as a result of the second scan task without performing the second scan task upon determining that the first document is identical to the second document.

15. The method according to claim 14, further comprising:
  displaying the first pre-scan image and the second pre-scan image on a display unit upon determining that the first document is not identical to the second document.

16. An image forming apparatus comprising:
  a scanner to scan a first document and a second document;
  a manipulation device to generate a first scan command with respect to the first document and a second scan command with respect to the second document;
  a storage unit to store a first pre-scan image and a first main scan image by performing a first scan task in response to the first scan command and to store a second pre-scan image by performing a second scan task in response to the second scan command;
  a display unit to display the first pre-scan image and the second pre-scan image; and a control unit to determine whether the first document is identical to the second document by comparing the first pre-scan image with the second pre-scan image, and to use the first stored main scan image as a result of the second scan command without performing the second scan task upon determining that the first document identical to the second document.

17. A method of controlling an apparatus, the method comprising:

comparing a first document having been scanned with a second to be scanned; and using a scan image of the first document as a scan image the second document upon determining that the first document is identical to the second document.

* * * * *